United States Patent [19]

Moore et al.

[11] 3,956,515

[45] May 11, 1976

[54] EDIBLE STARCH BATTERS

[75] Inventors: Carl O. Moore, Rochester; Hsiung Cheng; Robert V. Schanefelt, both of Decatur, all of Ill.

[73] Assignee: A. E. Staley Manufacturing Company, Decatur, Ill.

[22] Filed: Apr. 5, 1974

[21] Appl. No.: 458,377

[52] U.S. Cl. ............................. 426/302; 426/305; 426/549; 426/555
[51] Int. Cl.² ................................. B65B 55/00
[58] Field of Search ........... 426/152, 215, 289, 295, 426/296, 439, 293, 302, 549, 550, 555

[56] References Cited
UNITED STATES PATENTS

| | | | |
|---|---|---|---|
| 3,255,021 | 6/1966 | Earle et al. | 426/293 |
| 3,527,646 | 9/1970 | Scheick et al. | 426/289 |
| 3,607,393 | 9/1971 | Gabel | 426/215 X |
| 3,723,137 | 3/1973 | Fischer et al. | 426/293 |

*Primary Examiner*—Raymond N. Jones
*Attorney, Agent, or Firm*—M. Paul Hendrickson; Charles J. Meyerson

[57] ABSTRACT

Starch batters which can be applied to food pieces (e.g., chicken), breaded, frozen and subsequently fried into a high-quality, fried, breaded product are obtained by employing a novel batter starch system. The batter starches are comprised of ungelatinized, cold-water swelling starches and starch granules having a gelation point above 125°F. The starch batters are formulated in aqueous mediums (e.g., below 120°F.) to provide a batter system containing unswollen starch granules uniformly dispersed within an adhesive matrix of highly swollen, non-birefringent, hydrated starch granules.

22 Claims, No Drawings

EDIBLE STARCH BATTERS

BACKGROUND OF THE INVENTION

In the preparation of deep fat fried food products, it is conventional to coat food pieces with a batter by dipping, spraying, cascading, etc., applying breading (e.g., corn meal, bread and cracker crumbs, etc.) and then frying the freshly breaded food pieces. Within recent years the establishment of central breading operations and sale of pre-breaded, fryable food products to the trade has become a rapidly growing food industry. Due to the perishable character of these products, it would be most advantageous to provide the consumer with a frozen, uncooked, breaded product.

It is conventional to employ gelatinized and/or ungelatinized cereal starches or cereal flours in aqueous batters with other optional ingredients such as egg solids, corn meal, cream of tartar, seasoning, flavoring agents, coloring agents, salt, edible thickening agents, etc. These starch containing batters are frequently identified by the art as starch batters or flour batters. Starch batters are usually formulated as an aqueous slurry of ungelatinized starch. Functionally these starch batters are supposed to adhesively coat and adhere to the food piece surface and provide an adhesive matrix for breading. It is essential that the starch batters maintain their adhesive character during the frying step and impart a high quality color, texture, taste and mouthfeel to the ultimate fried product.

Starch batters are economically attractive to industry, but possess inherent defects which have heretofore limited their adaptability and usage in batter breading and frying operations. The art has attempted to correct these inherent deficiencies by utilizing a variety of starches alone or in combination with supplemental starch batter additives. Early starch batter systems were primarily predicated upon either starch containing flours or granular starches. In an attempt to improve upon these starch batters, a host of edible thickeners such as vital wheat gluten, non-fat milk solids, soya protein, gum arabic, sodium alginate, carboxymethyl cellulose, hydroxypropyl methylcellulose, etc. have been proposed as supplemental batter additives.

Chemically modified or pregelled starches have also been proposed as a partial or complete replacement for the unmodified, granular batter starches. For example, U.S. Pat. Nos. 3,607,393 by Gabel et al., 3,655,443 by C. Campbell and 3,208,851 by J. A. Ancinori et al. suggest replacing the raw starches with oxidized, granular starches. Chemically inhibited granular starches (e.g., granular starches reacted with polyfunctional cross-linking agents to impart a greater resistance towards pasting or gelationization) have also been proposed as a replacement for unmodified granular starches in U.S. Pat. No. 3,052,545 by J. J. Ducharme et al.

Starch batters containing pregelled or pasted starches have also been proposed. In U.S. Pat. No. 3,723,137 by Fischer et al., batter coatings are formed directly on a food piece by coating a prewetted food piece with dry pregelled starches. These pregelled starch coated food pieces are immersed in a fluid to provide a battered product. Pasted alkali and alkaline earth dichlorocyanurate starch batters are disclosed in U.S. Pat. No. 3,317,346 by W. H. Kibbel, Jr., et al. In German Federal Republic Application 2,136,636 starch batters containing from about 20% to about 45% by weight gelatinized starch have been proposed as a possible alternative.

As evident from the aforementioned art, a host of unmodified and modified batter starches have been proposed as a possible means for correcting the inherent functional defects of starch batters. Notwithstanding, the starch batter problem (especially with poultry products) still persists as evident by Poultry Science: 51 (4) pages 1215–1222 by Baker et al. (1972) and 47 pages 739–746 by Hale et al. (1968) and "Adhesion of Coatings on Frozen Fried Chicken" by H. Hanson et al. in Food Technology 17 pages 793–796 (1963) (all of which are incorporated herein by reference). The starch batters presently available to the food industry are not suitable for use in certain processes which involves freezing of uncooked, breaded food pieces (e.g., chicken, pork, beef pieces ) and subsequent frying thereof.

OBJECTS

It is an object of this invention to provide a batter starch dry mix which can be easily reconstituted in an aqueous medium and applied to food pieces, breaded, and fried into a high quality food product.

Another object of the invention is to provide batter starches possessing improved adhesion before, during and after frying.

A still further object is to provide a batter starch mix and starch batter suitably adapted to improve upon the frying efficacy of uncooked, frozen, breaded food pieces.

An additional object of the invention is to provide a method for preparing improved fried, breaded food pieces via novel starch batters.

DESCRIPTION OF THE INVENTION

It has been discovered that significantly improved starch batters can be prepared from batter starches comprised of ungelatinized granular starches and granular, cold-water swelling starches which possess sufficient cold-water swelling properties to convert in cold or warm aqueous starch batter systems to a non-birefringent form. The starch batters of this invention are generally comprised of:

A. from about 1 to about 40 parts by weight of a cold-water swelling starch characterized as possessing a birefringent, granular character prior to dispersion in water and a loss of birefringency within 10 minutes after being dispersed in water (1% by weight dry starch) at a temperature within the range of 40°F. and 120°F.;

B. 200 parts by weight of starch granules which are characterized as maintaining a birefringent granular character when dispersed in water for 10 minutes at a concentration of 1% by weight starch solids and a temperature of 125°F.

C. water at a starch solids to water weight ratio of less than about 2:3.

The batter starches of this invention provide the food industry with a batter system which can be applied or coated upon the surface of a food piece, breaded and frozen, and subsequently deep fat fried to provide a high-quality, deep fat fried, breaded food piece.

The cold-water swelling batter starches distinctly differ from pregelled starches. Pregelled starches are conventionally prepared by heating an aqueous starch slurry to a temperature above the gelation point of the starch and thereby swell and/or burst the starch granular structure (frequently referred to as pasted starches) followed by drying thereof to provide a dry pregelled starch product. Pregelled starches neither possess a birefringent character or a granular starch structure. Unlike pregelled starches, the cold-water swelling batter starches herein possess a granular structure akin to raw, ungelatinized starches. Similar to raw granular starches, the cold-water swelling batter starches herein possess both granular and birefringent characteristics prior to dispersion in aqueous mediums. The birefringent and granular character of these cold-water dispersible batter starches can be easily identified by dispersing the cold-water swelling starches in mineral oil (at 1% by weight starch concentration and 20°F.) and microscopically examining the dispersed starch granules under polarized light. Microscopic examination of the cold-water swelling starches employed in this invention will typically reveal more than 80% of the starch granules as having birefringency. Improved starch batter performance is accomplished by utilizing those cold-water swelling starches having at least 90% granular birefringency and most preferably wherein substantially all of the starch granules possess birefringency (e.g., more than 95%) prior to their dispersion in water.

The cold-water swelling batter starches are saliently different from the unmodified and inhibited granular starches by their capacity to swell and lose their birefringency in aqueous mediums at relatively low temperatures (e.g., 120°F. or less). Unmodified, inhibited and slightly derivatized granular starches normally require temperatures well in excess of 125°F. for pasting. These granular starches when dispersed in water (at 1% by weight starch solids level) will retain their granular and birefringent character throughout the temperature range of 40°F. to 125°F. for 10 minutes or more. To effectuate a loss of birefringency, the aqueous medium in which these granular starches are dispersed must be raised to a temperature equal to or greater than their gelation point. At temperatures below the starch pasting or gelation point, the granular and birefringent character of these starches will remain unchanged.

The cold-water swelling batter starches are generally prepared by modifying granular starches with chemical reagents to provide a granular, modified food starch which will swell and readily disperse in water at temperatures of less than 120°F. U.S. Pat. Nos. 2,516,634 and 2,845,417 by Kesler et al., 3,070,594 by Harris et al. 2,865,762 and 2,884,412 both by Neukom, 3,705,891 by Tuschhoff et al., and 3,725,386 by Hanson et al. are typical means for preparing granular, cold-water swelling starches. The granular cold-water swelling batter starches herein may be derived from a variety of starch sources, such as corn, wheat, tapioca, sorghum, waxy maize and high amylose starches as well as certain modified food starches as taught in U.S. Pat. Nos. 3,725,386 and 3,705,891. The more highly derivatized and uninhibited granular starches will generally possess more rapid cold-water swelling properties (e.g., 40°F. or less) than those derivatized to a lesser extent.

Hydroxypropylated starch granules prepared in accordance with U.S. Pat. Nos. 3,705,891 and 3,725,386 are particularly well suited as cold-water swelling batter starches. Hydroxypropylated starches having an average hydroxypropyl degree of substitution (D.S.) of more than 0.1, advantageously between about 0.15 and about 0.5 D.S. and most preferably between about 0.17 to about 0.25 D.S. are particularly useful as cold-water swelling starches herein. The cold-water swelling batter starches prepared in accordance with U.S. Pat. No. 3,725,386 possess significantly improved starch batter properties in the presence of salts. A cold-water swelling starch possessing sufficient tolerance towards ionic salts is desirable because most batters are formulated or employed in conjunction with salt batter additives or salted products.

The granular cold-water swelling batter starches herein have, in general, the common property of exhibiting a loss of birefringency when dispersed (1% by weight starch solids level) in water at temperatures below 120°F. This loss of birefringency will occur within 10 minutes of their initial disperson in water. The time interval necessary to effectuate a loss of birefringency and minimum temperature therefore will primarily depend upon the degree of granular starch derivatization. The more highly derivatized cold-water swelling starches exhibit more rapid swelling in cold-water and concomitant loss of birefringency therein. The cold-water swelling starch granules derivatized to a lesser degree normally require higher temperatures and a longer time interval to effectuate the swelling and birefringency loss. Slightly inhibited, cold-water swelling starches (e.g., cross-linked granular starches) will likewise inhibit the cold-water swelling character of the granular starch, notwithstanding a high D.S. of hydrophilic groups (e.g., hydroxypropyl groups). Although the specific temperature necessary to effectuate this loss of birefringency may vary, the cold-water swelling starches herein characteristically lose their birefringency within 10 minutes after being dispersed in water at temperatures between 40°F. and 120°f. Some will swell and exhibit a birefringency loss below 40°F. (e.g., 35′F.) as well as within the 40°–120°F. range. Others may require a temperature of 100°F. or more to effectuate a loss of birefringency. Cold-water swelling starches which swell in water (at 1% concentration) at temperatures of about 90°F. or less and lose their birefringency in less than about 5 minutes are advantageously used herein. For those applications wherein it is desired to freeze the starch batter after breading, cold-water swelling starches evincing a loss of birefringency in less than 5 minutes at dispersion temperatures of less than about 75°F. (e.g., about 35°F. to about 65°F.) are preferably employed as a batter starch component herein.

Commercially available cold-water swelling starches identified as NU-COL 231, NU-COL 326 and NU-COL 4227 (manufactured and sold by the A. E. Staley Manufacturing Company, Decatur, Illinois) will typically respectively achieve a maximum uncooked Brookfield viscosity (5% by weight dry solids level, pH 6.5, at 23°C.) within 2 to 3 minutes (about 9,000 cps), 3 to 5 minutes (about 5,500 cps) and 1 to 2 minutes (about 9,500 cps). Each of these starches also have excellent viscosity stability as evidenced by typical 10 minutes and 24 hour viscosity readings respectively of 9,000 cps and 7,000 cps, 5,500 cps and 4,800 cps and 9,500 cps and 9,500 cps. These three batter starches lose their birefringent character in less than 5 minutes when formulated into batter, but still possess highly hydrated swollen granular structure (e.g., sufficiently swollen and hydrated to have a non-birefringent character with no appreciable destruction or bursting of the starch granules therein). These highly swollen, non-birefringent granules impart a stable viscosity, salt tolerance and exceptional adhesive properties to the batter starches of this invention. In the starch batters, the cold-water swelling starches herein function as a supportive batter matrix for the non-cold water dispersible starch granules. The cold-water swelling batter starches are an excellent adhesive and binder for breading.

The starch batters and dry starch batters also contain as essential ingredient, granular starches which have pasting temperatures (i.e., gelatinization point) in excess of 125°F. These granular starch materials may be derived from a variety of starch sources including both the cereal and tuber starches. Exemplary granular starches include modified and unmodified tapioca, corn, high amylose corn, sweet potato, potato, waxy maize, canna, arrowroot, sorghum, waxy sorghum, waxy rice, sago, rice, etc. as well as mixtures thereof. In general the Kofler gelatinization temperature range for unmodified food starch granules will range between 125°F. to about 145°F.[1] (e.g., potato starches) up to 230°F. (e.g., high amylose corn starches). Most of the unmodified granular starches (e.g., corn, rice, waxy maize, etc.) will have a gelatinization temperature range between about 145°F. and 160°F.[1] Starch flours may also be used as a starch source.

[1] - Starch Chemistry & Technology, Vol. 1 (1965) by R. Whistler et al. e.g., see page 292.

As well recognized by the art, the gelatinization temperature of unmodified starch granules can be lowered or raised by treating and modifying the granules with chemical reagents. Illustrative food grade, modified starches include acid-modified starches, oxidized starches and inhibited starches (for example, starches cross-linked by reacting native granular starches with polyfunctional cross-linking agents), starch phosphatides, etc. Oxidized granular starches such as discussed in U.S. Pat. Nos. 3,607,393, 3,655,443 and 3,208,851, mentioned above may be utilized as the high pasting batter starch component. Similarly inhibited starches such as discussed in U.S. Pat. Nos. 3,052,545 and 3,238,193 by J. Tuschhoff et al., etc. may also be used as a granular starch component herein.

IT is important in practicing the present invention to utilize a granular starch which will retain its granular character in the starch batter and not lose its birefringency. By employing the cold-water swelling starches in combination with the granular starches, it is now possible to achieve a batter starch having significantly improved adhesiveness while retaining the desirable starch slurry attributes of the conventional starch batters.

By selectively choosing the granular starch component upon the basis of its amylose and amylopectin content, it is possible to alter the taste, color and textural properties of the fried products. For example, unmodified high amylose starches are suitably adapted for starch batter formulations and dry batter starch mixes wherein it is desired to impart a firm, crusty and crisp texture to the fried breaded food piece. The fried batter obtained from the high amylose batter starch formulation will exhibit little, if any, absorbed fat. Conversely, unmodified granular starches consisting of amylopectin and essentially free of amylose (e.g., waxy maize) will provide a fried product having a mellow, soft, smooth, crumbly texture with a high degree of fat absorbtion. The high amylopectin starches will generally impart a very light color (e.g., tan) to the fried product. The high amylose batter starches impart a darker brown color. Unmodified starch granules having an amylose content of about 15 to less than about 30% by weight and an amylopectin content of about 70% to about 85% (e.g., corn starch) generally impart a golden brown color, tender but crisp fried texture with excellent adhesion and elasticity attributes. Similarly, blends of unmodified starch granules can be employed to vary the color, taste and textural character of the fried products. Modified food starch granules can likewise be selected and used alone or in combination with unmodified food starch granules to alter the taste, color and textural character of the fried product.

In the dry starch batter mixes and the starch batter formulations herein, the proportion of cold-water swelling starch granules to granular starch which have a gelation point above 125°F. will range from about 1 to about 40 parts by weight cold-water swelling starches for each 200 parts by weight of the latter. The proportion of these two starch components will depend upon the desired properties of the fried product, the amount of available water in the starch batter and the swelling power of the cold-water swelling granular starch component. As mentioned herein, those cold-water swelling granular starches which are derivatized to a higher degree of substitution possess a higher degree of swelling in aqueous medium below 120°F. than those derivatized to a lesser degree of substitution. Accordingly, the cold-water swelling starches derivatized to a lower degree of substitution will, in general require a greater amount than those having a higher degree of substitution. Advantageously, the batter starches and dry starch batter mixes herein will contain from about 8 to about 20 parts by weight cold-water swelling granular starch for each 200 parts by weight of the high pasting temperature granular starch component. In the preferred embodiments of the invention, the starch batters and dry mix will contain about 10 parts to about 15 parts by weight of cold-water soluble batter starches for each 200 parts by weight granular starches of a high gelatinization temperature.

The starch batters of this invention are obtained by dispersing the aforementioned batter starches in an aqueous medium. Any edible aqueous medium which will impart the appropriate viscosity characteristics to the desired starch batter may be used for this purpose. Water or any other suitable water containing food product (e.g., milk, eggs, etc.) may be used as a dispersant for the present batter starches. Dispersion of the batter starches in an aqueous medium provides a batter system containing unswollen starch granules uniformly dispersed within an adhesive matrix of highly swollen, non-birefringent, hydrated starch granules. In order to maintain the granular integrity of the high temperature pasting starch, the temperature of the aqueous medium dispersant is maintained below the gelation point of the high pasting temperature starch component. For example, if it is desired to employ a cold-water swelling granular starch with a capacity to fully hydrate and lose its birefringency in aqueous medium at 35°F. in conjunction with a high amylose starch, the temperature of the aqueous medium employed in dispersing and formulating the starch batter may range from about 35′F. to about 230°F. For unmodified corn starch, the starch batter formulating temperature will generally be maintained at less than about 145°F. Granular starches of lower pasting temperature or cold-water swelling starches of a lesser cold-water swelling power will have a more narrow temperature range to fully hydrate the cold-water swelling starch without pasting the birefringent granular batter starch component.

The batter starches of this invention are particularly adapted for use in starch batter recipes which are formulated at aqueous medium dispersion temperatures of less than 120°F. The starch solids to water weight ratio in the starch batter may range from about 1:9 to about 9:11. Atypical of conventional batter starches, the combination of batter starches herein enables the food industry to effectively apply starch batters to food pieces at a lower starch solids level. Conventionally, starch batters will usually contain a starch solids to water ratio between about 0.85 to 1.3 parts starch for each part by weight water with about a 1:1 weight ratio being most typical. The starch batters of this invention possess excellent adhesion to the food piece substrate and frying properties without necessitating predusting, addition of ancillary thickening agents or precooking of the food piece. If desired, the batter flours containing proteinaceous or glutenous material and ungelatinized starch granules (e.g., cereal flours) may be used as a source for the granular, birefringent starch batter component. The cereal flours may serve as a partial or complete source of the high temperature gelling starch component. Since the gluten portion of most cereal flours will impart both a thickening effect and an adhesive character to the starch batter, a lesser amount of cold-water swelling starch may be used therewith. Advantageously the starch batters herein contain about 1 part to about 2 parts by weight batter starch solids for each 4 parts by weight water. Conventional breading agents may be directly applied to starch batter coatings to provide excellent adhesion during the frying thereof. Preferably the starch batters are prepared at a temperature of 35°F. to about 80°F., and most preferably at temperatures less than about 70°F. At a batter starch to water weight ratio of about 1:3, the breading and deep fat frying characteristics of poultry products of the present starch batters are superior.

Excessive contamination of the starch batter mix and starch batters with pregelled starches should be avoided. On a dry starch solids basis, it is particularly desirable that the resultant batter starch contain no more than 15% pregelled starch (total dry starch solids basis). In preparing the starch batters, high shear mixing conditions or thermal disintegration of the granular structure of the high temperature pasting starches should be avoided. Likewise the addition of pregelled starches are suitably avoided in the starch batter formulations. Improved starch batter functional attributes are achieved from starch batters which contain no more than 10% by weight and preferably less than 5% by weight gelatinized starch.

If desired, other conventional starch batter additives such as seasoning, spices, flavoring and coloring agents, salt, cream of tarter, foaming agents, egg yolks, sweeteners, preservatives, antioxidants, thickening agents (e.g., mucilaginous and/or proteinaceous materials such as milk and non-fat milk solids, caseinates, wheat gluten, egg albumin, carboxymethylcellulose, alginates, gum arabic, hydroxypropyl cellulose, etc.) may be incorporated into the dry starch batter mixes and starch batters of this invention. Since the cold-water swelling starches impart excellent adhesiveness and viscosity to the starch batter such thickening agents can be totally eliminated from the starch batters.

The viscosity of the starch batter as applied or employed in coating of the food piece can be tailored (e.g., by the amount of batter water and/or cold-swelling starch) to fit its particular end usage. For example, a low viscosity starch batter (e.g., Brookfield viscosity of 50 cps at 23°C.) may be suitably used in providing thin, adhesive food piece coatings. Conversely, a thicker coating for starch battered products can be accomplished by employing a more viscous starch batter (e.g., 10,000 cps). For most coating applications, the starch batter viscosity will range from about 500 to about 5,000 cps and most preferably from about 2,000 to about 2,500 cps.

The starch batters of this invention may be utilized to coat a wide variety of food pieces. Food pieces which are adapted to be fried in the presence of cooking oils or fats (e.g., oven, skillet and deep fat fried food pieces) can be suitably coated therewith. Typical food pieces coated with the starch batters of this invention include fresh and frozen meats, synthetic meat products, snack and vegetable products such as fish sticks, fish fillets, fish steaks, whole fish, scallops, oysters, shell fish, clams, shrimps, lobster, poultry (e.g., chicken and turkey) veal, pork, beef, eggplant and onion rings, fish and crab cakes, potato puffs, hors d'oeuvres, meat balls, textured vegetable protein products, fritters, croquettes, etc.

The starch batters of this invention are particularly well adapted for use in the preparation of breaded poultry and animal meat pieces (e.g., chicken, pork, beef, etc.). As evident from the trade publications cited hereinbefore in the background of the invention, considerable difficulty has been encountered in discoverying a starch batter which will provide a high quality, deep fat fried, breaded poultry product. Starch batter adhesion to the poultry piece prior, during and after the frying has been a problem. Preconditioning of the poultry pieces (e.g., predusting with starches, precooking and incorporation of ancillary thickening agents such as proteins and gums) have been suggested as possible means for improving the efficacy of these starch batters. The batter starches of this invention can be directly applied to poultry pieces, breaded and deep fat fried to provide a high quality fried product. The cold-water soluble batter starch component also provides the additional benefit in preparing high quality, fried products from prebattered and breaded, frozen poultry pieces.

When applied to poultry pieces (e.g., chicken), the starch batter adhesion to the chicken substrate and breading material is excellent. The starch batters can be easily prepared and effectively applied to the poultry piece without necessitating costly ancillary processing conditions or specialized equipment therefore. The batter coating thickness and uniformity can be conveniently controlled by the character of the starch batter. Consistency, homogenity (e.g., uniformity of the starch granule dispersion), viscosity stability of the present starch batters are superior. The batter starches of this invention possess excellent stability against syneresis and separation of starch granules when stored in conventional batter application equipment for prolonged periods of time. Unlike conventional starch batter slurries which usually necessitate carefully controlled mixing conditions to maintain a uniform suspension of starch granules, the present starch batters do not require continuous mixing thereof. During the breading operation, the starch batter coatings tenaciously adhere to the poultry pieces while providing a stable adhesive matrice for the breading. The starch batters possess excellent adhesive and coating attributes at relatively low, application temperatures. The present starch batters may be applied at battering temperature or upon cold chicken pieces in the magnitude of 60°F. or less (e.g., 35°F.) without adversely affecting their over-all performance. Bacterial contamination of both the starch batter and battered product can be effectively minimized by conducting the battering steps at these lower temperatures. The effective battering characteristics of these batter starches at the lower application temperatures effectively facilitates the production rate of frozen, prebreaded and prebattered products. The ability to operate at these relatively low battering temperatures aids in preserving the taste, moistness and texture of the food substrate.

The starch batters herein as well as the battered products thereof possess excellent freeze-thaw stability. This functional attribute makes the starch batters herein particularly well suited for processes which involve freezing of the breaded poultry pieces and subsequent frying thereof. Frozen, breaded poultry pieces prepared from the starch batters of this invention retain their adhesiveness and elasticity towards the frozen substrate and breading. Consequently the frozen, breaded poultry pieces are suitably adapted to withstand physical abuses as normally expected and encountered in the interstate and foreign shipment thereof (e.g., resistance towards tearing, shearing, impact and such other physical stresses). When stored for relatively prolonged periods of time, the frozen battered products of this invention also have excellent resistance against deterioration. Similarly, the batters can be exposed to freeze-thaw cycling without adversely affecting the over-all functionality of the battered product.

The battered, deep fat frying characteristics of freshly prepared poultry pieces and frozen pieces are superior. Unlike conventional starch batters, the frozen, breaded products of this invention are comparable in taste, texture, juiceness, fat absorbency, color, tenderness, coating adhesiveness to those which are obtained from freshly breaded and unfrozen food pieces. Flaking or separation of breaded batter from the food piece such as normally encountered with conventional starch batters is not a problem with the starch batter of this invention.

The starch batters of this invention are compatible with conventional breading materials. The resultant breaded, battered food pieces are suitably adapted for cooking in the presence of frying oils at elevated temperatures (e.g., skillet, baking, deep fat frying, etc.). The breaded, battered products of this invention are particularly well suited for immersion in frying oils and cooking at deep fat frying temperatures which are in excess of 250°F. and most usually between about 350°F. to about 425°F. If desired, convenience, precooked breaded meat (e.g., partially cooked or completely precooked) products such as conventionally traded in the frozen or refrigerated form can be prepared by the starch batters of this invention. The following examples are merely illustrative and should not be construed as limiting the scope of the invention.

EXAMPLE I

A batter starch dry mix was prepared by uniformly dry blending in a ribbon blender 6.95 parts by weight of a granular, cold-water swelling starch[2] and 100 parts by weight unmodified granular starch. This granular cold-water swelling starch component when dispersed in mineral oil (at 1% by weight dry starch solids at 23°C. with manual stirring) and examined under polarized light indicated approximately 96% of the starch granules as being birefringent (5,000 different starch granules are examined). Microscopic examination of the cold-water swelling starch under polarized light after being dispersed in water (at 23°C. and at a dry starch solids concentration of 1% and mixed in a standard household mixer for 4 minutes) at a low speed indicated substantially all of the starch granules had lost their birefringency (5,000 different starch granules examined). The Brookfield viscosity of the aforementioned cold-water swelling starch at a pH 6.5 and 5% solids after dispersion in water for 10 minutes and 24 hours was 9,500 cps.

[2] "NU-COL 4227" manufactured and distributed by A. E. Staley Manufacturing Company, Decatur, Illinois The starch batter dry mix was reconstituted in tap water (60°F.) by mixing in a Hobart mixer at a medium speed for 10 minutes at a starch solids to water weight ratio of 1:3. The Brookfield viscosity of the resultant starch batter at 23°C. was approximately 2,250 cps (No. 3 spindle at 20 rpm). Microscopic examination of the resultant batter indicated that the cold-water swelling starch had converted to the non-birefringent form. The cold-water swelling starch granules were in a highly hydrated and swollen with the unmodified food starch granules being uniformly dispersed therein in essentially an unswollen, discrete, birefringent starch granular form.

The starch batter was then employed to coat chicken pieces (breast, wings, drum sticks, thighs, backbone, neck) by dipping the chicken pieces into the starch batter. The starch batter was uniformly coated on all of the chicken pieces with excellent adhesion thereto.

A commercial breading dry mix containing a dry blend of wheat flour, bread crumbs, salt, malted barley flour, spices and herbs, monosodium glutamate, natural hickory flavor and artificial color was placed in a plastic bag along with chicken pieces and shaken to provide a breaded chicken piece. On a chicken piece weight basis, the batter and breading pickup by the chicken piece was about 20% by weight. A greater or lesser pickup was achieved by lowering or elevating the amount of cold-water swelling starch in the formulation. For comparative purposes, the amount of cold-water swelling starch in the starch batter was reduced to 6.5 parts by weight and increased in another starch batter to 7.5 parts by weight. Each of these comparative batters uniformly coated the pieces with excellent adhesive characteristics, but resulted in a batter and breading pickup of about 15% for the lower level and 25% for the elevated cold-water swelling starch formulation. The breading firmly adhered to each of the starch batter coatings without any evidence of flaking or separation of either the breading or the batter coating from the chicken pieces. Some of the chicken pieces were deep fat fried for approximately 16 minutes in the hydrogenated vegetable frying oil at 375°F. The resultant fried pieces exhibited excellent breaded, batter adhesion to the chicken pieces with no concomitant flaking or separation therefrom. Physical handling of the fried, breaded piece indicated that the starch batter coatings had excellent adhesion to both the cooked chicken piece and the breading. The chicken substrate possessed excellent juiceness, moistness and tenderness. The fried chicken pieces were of a golden brown color with a tender, but crispy texture without any concomitant evidence of excessive fat absorption and generally posessed the attributes of a high quality fried, battered product.

The remaining portion of the breaded, battered chicken pieces were frozen. Upon completion of the freezing of the chicken pieces, there was no evidence of any separation of flaking of either the batter or breading from the chicken pieces. The frozen, battered and breaded chicken pieces were stable against fluctuation of divergent freezer temperatures as well as possessing excellent freeze-thaw cycling stability. In the frozen form, these breaded, battered chicken pieces were capable of withstanding the normal physical abuses as encountered in the commercial shipment thereof.

The frozen pieces were fried for 18 minutes in the same manner as the freshly prepared breaded, battered chicken pieces above. The fried chicken from these frozen pieces were equivalent in over-all quality as those prepared from the freshly breaded and fried chicken pieces. It was further observed, as in the case with the freshly battered and fried products above, that the adhesion and over-all breaded character of the divergent breaded chicken pieces employed in this example were substantially equivalent to one another.

The frozen, breaded and battered chicken pieces prepared in accordance with this example can be subjected to pressurized deep fat frying conditions (e.g., frequently used to accelerate frying) without adversely affecting the functionality of the starch batter coatings.

In a similar manner NU-COL 326[3] and NU-COL 231[3] (both hydroxypropylated corn starches), NU-COL 246[3] (a hydroxypropylated tapioca starch) and X-PAND'R[3] can be employed as a cold-water swelling starch component in the starch batters herein. As previously mentioned, various divergent granular starches having a gelation point in excess of 135°F. (e.g., oxidized granular starches, acid-modified granular starches, inhibited granular starches, high amylose starches, waxy starches, etc.) can be utilized to change the texture and color characteristics of the fried products. If it is desired to formulate a batter or apply the batter at processing temperatures above 120°F., inhibited granular cold-water swelling starches are most suitably employed.

[3] -Manufactured and distributed by A. E. Staley Manufacturing Company, Decatur, Illinois Since many embodiments of this invention may be made and since many changes may be made in the embodiments described, the foregoing is interpreted as illustrative and the invention is defined by the claims appended hereafter.

What is claimed is:

1. An edible aqueous starch batter adapted for use in coating articles and preparing fried food articles, said batter composition comprising:
    A. from about 1 to about 40 parts by weight of a hydrated, non-birefringent, cold-water swelling starch characterized as possessing a birefringent, granular character prior to dispersion in water and a loss of birefringency within 10 minutes after being dispersed in water at a temperature of less than 120°F., and at a starch concentration of 1% by weight (dry substance basis);
    B. 200 parts by weight of starch granules which are characterized as maintaining a birefringent granular character when dispersed in water for 10 minutes at a concentration of 1% by weight and a temperature of 125°F.; and
    C. water at a starch solids to water weight ratio of less than about 2:3, with said cold-water swelling starch (A) and said starch granules (B) being uniformly dispersed in water at a temperature below the gelation point of starch granules (B) to provide an aqueous starch batter composition consisting essentially of birefringent starch granules (B) uniformly dispersed within a matrix of the hydrated, non-birefringent, cold-water swelling starch (A).

2. The starch batter according to claim 1 wherein the 200 parts by weight of starch granules consists essentially of starch granules having a gelatinization temperature of greater than about 145°F.

3. The starch batter according to claim 2 wherein the cold-water swelling starch is characterized as exhibiting a loss of birefringency when dispersed in water at a temperature of less than 75°F.

4. The starch batter according to claim 3 wherein the starch batter contains on a total dry starch solids basis from about 8 to about 20 parts by weight cold-water swelling starch.

5. The starch batter according to claim 4 wherein the starch batter is substantially free from pregelatinized starch granules and the starch batter contains from about 1 to about 2 parts by weight starch solids (dry basis) for each 4 parts by weight water.

6. An edible starch batter dry mix adapted to be reconstituted in water at a temperature below 120°F. and applied as an adhesive breading binder to food pieces which may then be fried with edible oils to provide a fried breaded food piece, said dry mix comprising:
    A. from about 1 to about 40 parts by weight of cold-water swelling starch for each 200 parts by weight of starch granules, said cold-water swelling starch being characterized as possessing a birefringent granular structure prior to being dispersed in water and possessing sufficient cold-water swelling properties within a temperature range of 40° F. to 120°F. at 1% starch concentration level in water to convert to a non-birefringent form;
    B. 200 parts by weight of starch granules which are characterized as maintained a birefringent granular character when dispersed in water for 10 minutes at a concentration of 1% by weight and a temperature of 125°F.; with the dry mix being further characterized as containing the starch granules and in cold-water swelling starch as the major dry mix ingredients (weight basis).

7. The dry mix according to claim 6 wherein the 200 parts by weight of starch granules portion of the dry mix consists essentially of starch granules having a gelatinization temperature of greater than about 145°F.

8. The dry mix according to claim 6 wherein the cold-water swelling starch portion is characterized as exhibiting a loss of birefringency within five minutes when dispersed in water at a temperature of less than 75°F.

9. The dry mix according to claim 8 wherein the mix contains from about 8 to about 20 parts by weight cold-water swelling starch for each 200 parts by weight starch granules.

10. The dry mix according to claim 9 wherein the 200 parts by weight starch granules consists essentially of corn starch granules and the batter starch mix is substantially free from pregelled starch.

11. The dry mix according to claim 10 wherein the cold-water swelling starch portion of the mix consists essentially of a granular hydroxypropylated starch having a hydroxypropyl degree of substitution between about 0.15 to about 0.25.

12. A method for coating food articles with a starch-based adhesive coating composition which is suitably adapted for preparing fried food articles, said method comprising the steps of:
  A. preparing an edible aqueous batter by uniformly dispersing in water:
    a. about 1 to about 40 parts by weight of a birefringent, granular, cold-water swelling starch, said granular cold-water swelling starch being characterized as exhibiting within ten minutes a loss of birefringency when 1% by weight of the cold-water swelling starch is dispersed in water at a temperature of less than 120°F.;
    b. 200 parts by weight of an ungelatinized, granular starch characterized as requiring a temperature in escess of 125°F. (at 1% solids level in water) to convert the starch granules to a non-birefringent starch form; and
    c. water at a starch solids to water weight ratio of less than about 2:3, with the cold-water swelling starch (a) and the ungelatinized granular starch (b) being uniformly dispersed in the water at a temperature below the gelation point of the ungelatinized granular starch (b) to provide an aqueous batter comprised of ungelatinized granular starch (b) uniformly dispersed within a matrix of the hydrated, non-birefringent cold water swelling starch (a); and
  B. applying the aqueous batter to the surface of a food article and thereby providing a food article having a coating of said aqueous batter.

13. The method according to claim 12 wherein the batter is applied to a unfrozen meat product.

14. The method according to claim 13 wherein the battered meat products are breaded with breading.

15. The method according to claim 14 wherein the breaded meat products are deep fat fried.

16. The method according to claim 14 wherein the 200 parts by weight starch granules in the batter consists essentially of cereal starch granules having a gelatinization temperature of at least 145°F.

17. The method according to claim 16 wherein the batter contains from about 8 to about 20 parts by weight cold-water swelling starch for each 200 parts by weight starch granules and the batter contains from about 1 to about 2 parts by weight dry starch solids for each 4 parts by weight of water.

18. The method according to claim 17 wherein the batter is prepared at a temperature of less than 80°F.

19. The method according to claim 14 wherein the breaded meat product is a poultry piece and the breaded poultry piece is frozen and thereafter deep-fat fried.

20. The method according to claim 14 wherein the breaded meat product is subsequently fried with frying oil.

21. The method according to claim 19 wherein the batter consists essentially of cereal starch granules having a gelation temperature of greater than 145°F. and the cold-water swelling starch is characterized as exhibiting, within five minutes, a loss of birefringency when dispersed in water at a temperature within the range of about 35°F. to about 65°F.

22. The method according to claim 21 wherein the cold-water swelling starch is a hydroxypropylated starch having a hydroxypropyl D.S. of from about 0.15 to about 0.25.

* * * * *

UNITED STATES PATENT AND TRADEMARK OFFICE
CERTIFICATE OF CORRECTION

PATENT NO. : 3,956,515
DATED : May 11, 1976
INVENTOR(S) : Carl O. Moore, Hsiung Cheng, Robert V. Schanefelt It is certified that error appears in the above-identified patent and that said Letters Patent are hereby corrected as shown below:

Column 1, line 49, for "Ancinori" read ---Antinori---
Column 1, line 54, for "gelationization" read ---gelatinization---
Column 1, line 67, for "Republic Application" read ---Republic Patent Application---
Column 3, line 4, for "or" read ---nor---
Column 4, line 34, for "f." read ---F.---
Column 4, line 36, for "35′ F." read ---35°F.---
Column 4, bridging lines 63/64, for "hydrated swollen" read ---hydrated and swollen---
Column 5, line 35, for "discussed" read ---disclosed---
Column 5, line 39, for "discussed" read ---disclosed---
Column 6, line 61, for "35′ F." read ---35°F.---
Column 8, line 67, for "matrice" read ---matrices---
Column 9, line 2, for "temperature" read ---temperatures---
Column 9, line 3, for "60°E." read ---60°F.---
Column 9, bridging lines 39/40, for "tenderness, coating" read ---tenderness and coating---
Column 10, line 5, for "are" read ---were---
Column 10, bridging lines 26/27, for "were in a highly" read ---were highly---
Column 11, line 2, for "posessed" read ---possessed---
Column 11, line 7, for "of flaking" read ---or flaking---
Column 11, line 54, for "coating articles" read ---coating food articles---
Column 13, line 19, for "escess" read ---excess---

Signed and Sealed this

Twenty-ninth Day of March 1977

[SEAL]

Attest:

RUTH C. MASON
Attesting Officer

C. MARSHALL DANN
Commissioner of Patents and Trademarks